June 30, 1936. J. W. CAVENDER 2,045,631
GRADE INDICATOR
Filed Oct. 12, 1934
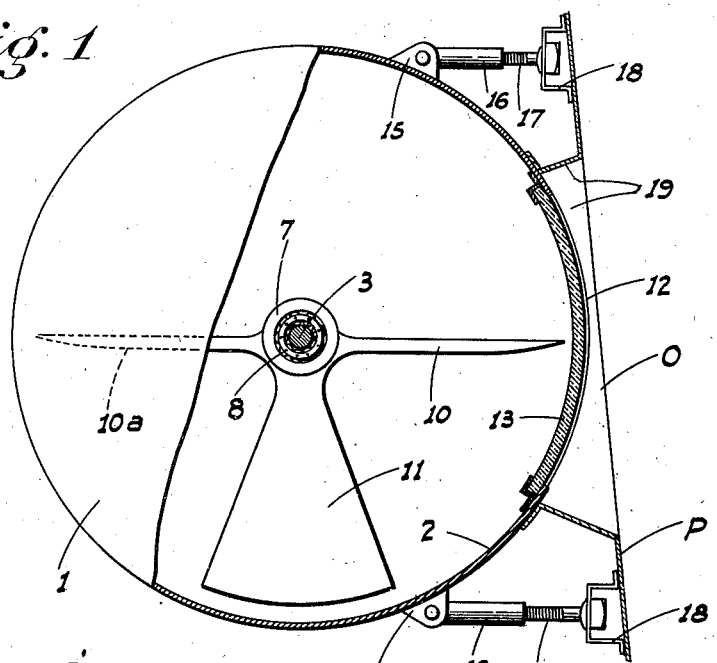
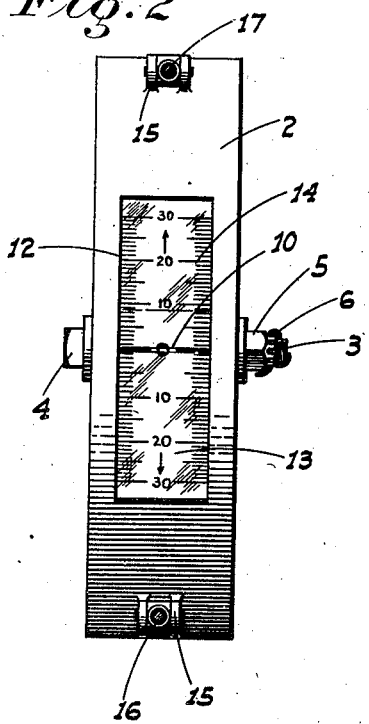
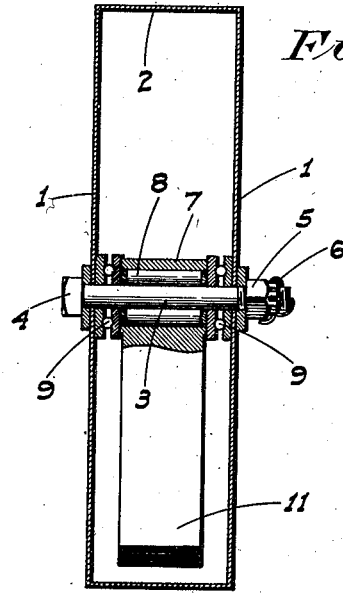
INVENTOR
*J. W. Cavender*
BY
ATTORNEY Patented June 30, 1936

2,045,631

UNITED STATES PATENT OFFICE 2,045,631

GRADE INDICATOR

John W. Cavender, Placerville, Calif.

Application October 12, 1934, Serial No. 748,063

2 Claims. (Cl. 33—215)

This invention relates to indicators and is particularly directed to that character of instrument for motor vehicles known as grade indicators or gradometers.

The principal object of my invention is to provide a grade indicator of this general character adapted to be mounted on the instrument panel of a motor vehicle which will instantly and correctly indicate the per cent of grade which the vehicle may be traversing at any given moment.

A further object of my invention is to provide a grade indicator having an adjustable mounting means for the casing of the indicator arranged so that the scale on the casing may be initially set in a proper position relative to the pointer irrespective of the angle of slope of the instrument panel and against which the indicator casing is disposed.

The main advantages of my improved grade indicator are many, some of the more important advantages being as follows:

The use of my grade indicator on a motor vehicle will inform the driver at a glance the per cent of grade and is especially of value when traversing unfamiliar roads, as in the mountains, and when the vehicle is traveling down a steep grade for instance. The condition of such grade is then instantly made known to the driver, who can at once slow down the vehicle in order to prevent taking unnecessary chances and the possibility of accidents.

Also on curved or mountain roads, especially at night, the percent of a down grade is deceiving and without a grade indicator accidents and loss of life often occur, especially on roads unfamiliar to the driver. When an upgrade is being negotiated the driver often fails to realize the severity of the grade and overloads the engine and forces the car along in high gear. At the same time he wonders why the car has apparently lost a great deal of its power and is apt to blame this supposed condition on poor carburetion or on faulty timing or other ignition troubles, when in reality, if the driver had a grade indicator before him, he would know that the difficulty arose only as the result of the steep grade. Much damage to motors and nervous strains on the drivers would be avoided if the vehicles were provided with my grade indicators and the drivers would shift into second gear when knowing definitely that a heavy grade was being negotiated. The chief value of the device therefore is in the saving it will effect in the protection of life and property, besides reducing what are actually unnecessary repair bills due to overloading of motors while ascending, and burned out brakes and overturned cars while descending unfamiliar hills.

A further object of the invention is to produce a simple and inexpensive device and yet one which will be exceedingly effective for the purpose for which it is designed.

These objects I accomplish by means of such structure and relative arrangement of parts as will fully appear by a perusal of the following specificaiton and claims.

In the drawing similar characters of reference indicate corresponding parts in the several views:

Fig. 1 is a side elevation partly broken out of my improved grade indicator as mounted on an instrument panel.

Fig. 2 is a front elevation of the same showing the grade indicating scale.

Fig. 3 is a transverse vertical section of the grade indicator.

Referring now more particularly to the characters of reference on the drawing, the body of the indicator comprises a dust-proof cylindrical case preferably of sheet metal and having side walls 1 connected by a peripheral wall 2, the casing being disposed so that its axis is horizontal and extends transversely of the vehicle.

Projecting centrally and axially through the side walls of the case is a spindle bolt 3 having a head 4 on one end outwardly of the casing and a castle nut 5 adjustably secured on its other end and held against rotation by a cotter pin 6.

Rotatably mounted on the spindle 3 within the case is a hub 7. This hub is mounted on a roller bearing 8 engaging the spindle and is disposed between a pair of thrust ball bearings 9 which are also mounted on the spindle 3. The thrust bearings and hub fit snugly between the side walls of the casing, the nut being tightened up to pull the opposed walls of the casing together just sufficient to provide the desired free rotation of the hub without any loose play.

Formed rigid with and extending diametrically from the hub are opposed vertically thin but transversely wide flat arms 10 and 10a, which are duplicates of each other so that their weights balance.

The arm 10 serves as the grade indicating pointer. Depending radially from the hub in a vertical plane centrally between the arms, but in the same transverse plane is a pendulum-like weight 11. Cut in the peripheral wall 2 of the case is a rectangular window 12 of predetermined arcuate extent which is backed by a transparent curved pane 13 which is preferably glass. Marked on said pane transversely thereof and in a suitable distinctive color are lines 14 denoting grade percentages. These percentages read of course in both directions up and down from a common zero mark to any desired maximum, such as thirty per cent.

To mount the casing in rigid connection with the instrument panel P of the vehicle ears 15 are secured to the outside of the wall 2 adjacent the top and bottom thereof. Swivelly mounted on the ears are rearwardly projecting tapped sleeves 16.

In adjustable and cooperating engagement with the sleeves 16 are draw bolts 17, the heads of which are rotatably mounted and held against movement on the back of the panel P in any suitable manner, as by U-shaped brackets 18.

The instrument panel P is provided with an opening O as large and which registers with the window 12 in the indicator case. The opening O in the panel is provided with inwardly projecting flanges 19 all about the same forming a saddle against which the adjacent portion of the case bears and against which it is held by means of the sleeves and draw bolts.

The above described supporting structure makes it possible to correctly adjust and mount the grade indicator relative to the instrument panel regardless of the slope of said panel within certain limits, so that the zero mark on the scale pane may be initially alined with the always horizontal pointer. This alining is of course done when installing the indicator on a vehicle, and when the vehicle is on a level surface, in order to subsequently obtain accurate readings.

If the panel is vertical for instance instead of having the slope shown (a condition which would lower the zero mark on the scale pane relative to the pointer if the pane remained centered in the panel opening) the lower bolt and sleeve unit 16—17 is contracted while the upper unit is correspondingly extended. This causes the casing to be rotated so that the scale pane is raised in the opening—an operation which is continued until the zero mark accurately alines with the pointer. If on the other hand the panel slope is greater than that shown (and which is presumed to be the average) the upper bolt unit is contracted and the lower unit is extended to rotate the case the necessary amount in a scale lowering direction.

In use the grade indicator is mounted and adjusted as heretofore described, behind the instrument panel of the vehicle. Then as the vehicle travels over roads in hilly or mountainous country the pendulum-like weight 11 will by gravity maintain the balancing arms 10 and 10a in a horizontal plane. The cylindrical case however being secured to the vehicle itself will in effect rotate about its axis, thereby shifting the graduated scale pane up or down. This of course will cause the pointer arm 10 to indicate on the scale the exact percentage of grade being traversed. The scale being in a distinctive color is readily visible to the driver and he can ascertain the percentage of grade by merely glancing at the scale for a moment. The accuracy and sensitivity of the device is assured by reason of the antifriction mounting of the pointer, since the roller bearing insures easy rotation of the pointer, while the thrust bearings prevent any possible jamming of the pointer when the vehicle is tilted laterally somewhat as when rounding a sharp curve.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A grade indicator for a motor vehicle comprising a cylindrical case adapted to be disposed with its axis extending transversely of the vehicle, a transparent graduated scale-plane forming part of the periphery of the case and extending from above to below the horizontal central plane thereof, a horizontal counterbalanced pointer pivoted in the case axially thereof and reading directly against the graduated pane, a fixed open saddle following the contour of and engaging the periphery of the case to the sides of said pane, and means mounted in connection with the saddle and with the case to clamp the latter in the saddle and rotatably adjust the case relative to the saddle.

2. A structure as in claim 1, in which said means comprises tapped sleeves mounted at one end on the periphery of the case above and below the pane for swivel movement about axes parallel to the axis of the case, said sleeves projecting in a substantially horizontal direction toward the front of the saddle, and elements mounted in fixed connection with the saddle and swivelly supporting the heads of the bolts.

JOHN W. CAVENDER.